United States Patent
Madabhushi et al.

(10) Patent No.: US 11,810,292 B2
(45) Date of Patent: Nov. 7, 2023

(54) DISEASE CHARACTERIZATION AND RESPONSE ESTIMATION THROUGH SPATIALLY-INVOKED RADIOMICS AND DEEP LEARNING FUSION

(71) Applicant: Case Western Reserve University, Cleveland, OH (US)

(72) Inventors: Anant Madabhushi, Shaker Heights, OH (US); Nathaniel Braman, Bethel Park, PA (US); Jeffrey Eben, Mayfield Village, OH (US)

(73) Assignee: Case Western Reserve University, Cleveland, OH (US)

( * ) Notice: Subject to any disclaimer, the term of this patent is extended or adjusted under 35 U.S.C. 154(b) by 344 days.

(21) Appl. No.: 17/038,934

(22) Filed: Sep. 30, 2020

(65) Prior Publication Data

US 2021/0097682 A1 Apr. 1, 2021

Related U.S. Application Data

(60) Provisional application No. 62/908,072, filed on Sep. 30, 2019.

(51) Int. Cl.
*G06T 7/00* (2017.01)
*G06T 7/11* (2017.01)
(Continued)

(52) U.S. Cl.
CPC ............ *G06T 7/0012* (2013.01); *G06F 17/16* (2013.01); *G06N 20/10* (2019.01); *G06T 7/11* (2017.01);
(Continued)

(58) Field of Classification Search
CPC ...................... G06T 7/0012; G06T 7/11; G06T 2207/20081; G06T 2207/20084;
(Continued)

(56) References Cited

U.S. PATENT DOCUMENTS

| | | | | |
|---|---|---|---|---|
| 2012/0008838 A1* | 1/2012 | Guyon | ............... | G16H 50/20 |
| | | | | 382/128 |
| 2020/0005931 A1* | 1/2020 | Madabhushi | ........ | A61N 5/1039 |
| 2020/0275857 A1* | 9/2020 | Lou | .................. | G01R 33/56341 |

FOREIGN PATENT DOCUMENTS

WO WO-2018017355 A1 * 1/2018 ......... G06K 9/00026

OTHER PUBLICATIONS

Amyar et al. "3-D RPET-NET: Development of a 3-D PET Imaging Convolutional Neural Network for Radiomics Analysis and Outcome Prediction." IEEE Transactions on Radiation and Plasma Medical Science, vol. 3, No. 2, Mar. 2019, pp. 225-231 (Year: 2019).*

(Continued)

*Primary Examiner* — Jon Chang
(74) *Attorney, Agent, or Firm* — Eschweiler & Potashnik, LLC

(57) ABSTRACT

Embodiments discussed herein facilitate training and/or employing a combined model employing machine learning and deep learning outputs to generate prognoses for treatment of tumors. One example embodiment can extract radiomic features from a tumor and a peri-tumoral region; provide the intra-tumoral and peri-tumoral features to two separate machine learning models; provide the segmented tumor and peri-tumoral region to two separate deep learning models; receive predicted prognoses from each of the machine learning models and each of the deep learning models; provide the predicted prognoses to a combined machine learning model; and receive a combined predicted prognosis for the tumor from the combined machine learning model.

32 Claims, 14 Drawing Sheets

(51) Int. Cl.
*G06V 10/764* (2022.01)
*G06V 10/771* (2022.01)
*G06V 10/774* (2022.01)
*G06V 10/80* (2022.01)
*G06V 10/82* (2022.01)
*G06N 20/10* (2019.01)
*G06F 17/16* (2006.01)
*G06V 10/20* (2022.01)
*G06V 10/776* (2022.01)

(52) U.S. Cl.
CPC .......... *G06V 10/255* (2022.01); *G06V 10/764* (2022.01); *G06V 10/771* (2022.01); *G06V 10/774* (2022.01); *G06V 10/776* (2022.01); *G06V 10/809* (2022.01); *G06V 10/82* (2022.01); *G06T 2207/20081* (2013.01); *G06T 2207/20084* (2013.01); *G06T 2207/30096* (2013.01); *G06V 2201/03* (2022.01)

(58) Field of Classification Search
CPC ........ G06T 2207/30096; G06V 10/255; G06V 2201/03; G06V 10/764; G06V 10/774; G06V 10/809; G06V 10/771; G06V 10/776; G06V 10/82; G06K 9/623; G06K 9/627; G06K 9/6292; G06F 17/16; G06F 18/2113; G06F 18/2413; G06F 18/254; G06N 20/10; G06N 7/005; G06N 3/0454; G06N 3/084; G06N 20/20; G06N 3/045; G06N 7/01
See application file for complete search history.

(56) References Cited

OTHER PUBLICATIONS

D'Amico et al. "Early Radiomics Experiences in Predicting CyberKnife Response in Acoustic Neuroma." ACM SIGBioinformatics Record, vol. 8, issue.3, https://doi.org/10.1145/3307616.330762, Dec. 2018, 3 pages (Year: 2018).*

Vial et al. "Assessing the Prognostic Impact of 3D CT Image Tumour Rind Texture Features on Lung Cancer Survival Modelling." IEEE Global Conference on Signal and Information Processing, Nov. 14, 2017, pp. 735-739 (Year: 2017).*

* cited by examiner

| Parameter | Training Set (n = 136) | | | Testing Set (n = 74) | | |
|---|---|---|---|---|---|---|
| | pCR | non-pCR | P Value | pCR | non-pCR | P Value |
| Number of patients | 53 | 83 | --- | 29 | 45 | --- |
| Age (years) | 49.64 ± 10.95 (26-79) | 52.77 ± 12.67 (23-73) | 0.08 | 49.69 ± 12.12 (27-69) | 51.55 ± 11.29 (32-69) | 0.26 |
| Receptor Status | | | 0.0001 | | | 0.25 |
| PR+ | 18 | 56 | | 13 | 30 | |
| HER2+ | 39 | 38 | | 22 | 23 | |
| ER+ | 22 | 69 | | 18 | 34 | |
| TN | 7 | 5 | | 4 | 4 | |
| Tumor Size (cm) | 3.55 ± 2.37 | 4.23 ± 2.98 | 0.08 | 3.63 ± 2.34 | 3.76 ± 2.08 | 0.40 |
| Clinical Stage | | | 0.10 | | | 0.89 |
| IA | 5 | 4 | | 2 | 2 | |
| IB | 0 | 0 | | 1 | 1 | |
| IIA | 19 | 29 | | 8 | 15 | |
| IIB | 16 | 24 | | 10 | 11 | |
| IIIA | 6 | 17 | | 4 | 11 | |
| IIIB | 0 | 5 | | 2 | 3 | |
| IIIC | 7 | 3 | | 2 | 2 | |
| IV | 0 | 1 | | 0 | 0 | |

P values were calculated using a Student t test for continuous variables and Chi-squared test for categorical variables

FIG. 4

| Feature Family | Number | Feature Description | Biological Significance |
|---|---|---|---|
| Laws' Texture Energy Measures | 25 | Response to 5-pixel × 5-pixel filter, capturing specific textural patterns within an image. Textural patterns captured by filter are combinations of five 1-D filters: level, edge, spot, wave, and ripple. | May detect patterns of heterogeneous enhancement and abnormal structure; have previously been shown to enable quantification of tumor-infiltrating lymphocytes (TIL) by lung computed tomography (CT) [21]. |
| Gabor Features | 48 | Response to convolution with Gabor filter at a specific wavelength (2, 4, 8, 12, 16, 32, and 64 pixels) and orientation (0°, 22.5°, 45°, 67.5°, 90°, 112.5°, 135°, 157.5°) | May capture changed in tumor microarchitecture on account of glandular morphology or detect the presence of TILs [21]. |
| Haralick Gray Level Co-occurrence Matrices (GLCM) | 13 | Quantification of heterogeneity and entropy of local intensity texture via gray level co-occurrence matrices computed within a 5-pixel × 5-pixel sliding window. | Regional changes in Haralick features following treatment have been shown to predict pCR in breast cancer [22]. |
| Co-occurrence of local anisotropy gradients (CoLlAGe | 13 | Quantification of local gradient alignment via application of Haralick GLCM metrics to dominant intensity gradient orientations within a 5-pixel × 5-pixel sliding window. | CoLlAGe entropy has previously been demonstrated to be effective in distinguishing breast cancer subtypes [23, 24]. |

FIG. 6

| Layer Type | IT Output | PT Output | Activation |
|---|---|---|---|
| Image Input | 146 (height) x 104 (width) x 3 (depth) x 3 (phase) | 150x110x3x3 | - |
| Conv3D, 8 filters, kernel=[3,3,1] | 144x102x3x8 | 148x108x3x8 | ReLu |
| Conv3D, 8 filters, kernel=[3,3,1] | 142x100x3x8 | 146x106x3x8 | ReLu |
| MaxPool, pool=[2,2,1], stride=[2,2,2] | 71x50x2x8 | 73x53x2x8 | - |
| BatchNorm, 0.5 momentum | - | - | - |
| Conv3D, 16 filters, kernel=[3,3,1] | 69x48x2x16 | 71x51x2x16 | ReLu |
| Conv3D, 16 filters, kernel=[3,3,1] | 67x46x2x16 | 69x49x2x16 | ReLu |
| MaxPool, pool=[2,2,1], stride=[2,2,2] | 33x23x1x16 | 34x24x1x16 | - |
| BatchNorm, 0.5 momentum | - | - | - |
| Conv3D, 24 filters, kernel=[3,3,1] | 31x21x1x24 | 32x22x1x24 | ReLu |
| Conv3D, 24 filters, kernel=[3,3,1] | 29x19x1x24 | 30x20x1x24 | ReLu |
| MaxPool, pool=[2,2,1], stride=[2,2,2] | 14x9x1x24 | 15x10x1x24 | - |
| BatchNorm, 0.5 momentum | - | - | - |
| Conv3D, 32 filters, kernel=[3,3,1] | 12x7x1x32 | 13x8x1x32 | ReLu |
| Conv3D, 32 filters, kernel=[3,3,1] | 10x5x1x32 | 11x6x1x32 | ReLu |
| MaxPool, pool=[2,2,1], stride=[2,2,2] | 5x2x1x32 | 5x3x1x32 | - |
| Flatten | 320 | 480 | - |
| Dense | 128 | 128 | ReLu |
| Dropout (IT: 0.5, PT: 0.3) | - | - | - |
| Dense | 64 | 64 | ReLu |
| Dropout (IT: 0.5, PT: 0.3) | - | - | - |
| Dense | 1 | 1 | Sigmoid |
| Parameters | 78,777 | 99,257 | |

IT: Intra-tumoral, PT: Peri-tumoral
Optimizer: Stochastic gradient descent, learning rate = 0.00025, Nesterov momentum = 0.9, decay = 0.0000025
Loss Function: Binary cross-entropy

|  | pCR | non-pCR | Test-set AUC |
|---|---|---|---|
| Number of patients | 82 | 128 | 74 |
| 1.5T DCE-MRI | 76 | 108 | (N = 69) 0.693 |
|    Siemens Espree | 46 | 53 | |
|    Siemens Avanto | 28 | 48 | |
|    Toshiba Titan | 1 | 0 | |
|    Philips Intera | 1 | 3 | |
|    Philips Achieva | 0 | 1 | |
|    Siemens Aera | 0 | 2 | |
|    Not Provided | 0 | 1 | |
| 3T DCE-MRI | 6 | 20 | (N = 5) 1.0 |
|    Siemens Verio | 2 | 9 | |
|    Philips Ingenuity | 2 | 8 | |
|    Philips Ingenia | 0 | 2 | |
|    Toshiba Titan | 1 | 0 | |
|    Not Provided | 1 | 1 | |
| Mean acquisition delay (s) | | | |
|    Phase 1 → 2 | 94.7 | 93.8 | |
|    Phase 2 → 3 | 70.7 | 69.5 | |
|    Phase 3 → 4 | 180.8 | 142.2 | |
|    Phase 4 → 5 | 71.7 | 70.7 | |
|    Phase 5 → 6 | 71.5 | 67.5 | |
| Slice Thickness (mm) | | | |
|    ST ≤ 1 | 6 | 9 | (N = 5) 0.667 |
|    1 < ST ≤ 2 | 49 | 54 | (N = 38) 0.762 |
|    2 < ST ≤ 3 | 21 | 52 | (N = 26) 0.647 |
|    3 < ST ≤ 5 | 6 | 13 | (N = 5) 0.500 |
| Resolution (x-axis) | | | |
|    Res < 350 | 4 | 9 | (N = 6) 0.375 |
|    350 ≤ Res < 500 | 76 | 110 | (N = 65) 0.743 |
|    500 ≤ Res < 650 | 2 | 6 | N/A |
|    650 < Res | 0 | 3 | N/A |
| Resolution (y-axis) | | | |
|    Res < 350 | 5 | 9 | (N = 6) 0.375 |
|    350 ≤ Res < 500 | 75 | 110 | (N = 65) 0.743 |
|    500 ≤ Res < 650 | 2 | 6 | N/A |
|    650 < Res | 0 | 3 | N/A |

FIG. 11

|  | Deep Learning | | Radiomics | | Fused |
| --- | --- | --- | --- | --- | --- |
|  | Intra-tumoral ($D_T$) | Peri-tumoral ($D_P$) | Intra-tumoral ($R_T$) | Peri-tumoral ($R_P$) | |
| Computational Annotations – Test AUC | 0.607 | 0.617 | 0.593 | 0.551 | 0.660 |
| Original Annotations – Test AUC | 0.656 | 0.698 | 0.677 | 0.645 | 0.723 |

FIG. 12

Individual Representations

| | Deep Learning | | Radiomics | |
|---|---|---|---|---|
| | Intra-tumoral ($D_T$) | Peri-tumoral ($D_P$) | Intra-tumoral ($R_T$) | Peri-tumoral ($R_P$) |
| CV AUC (SD) | 0.709 (0.043) | 0.709 (0.047) | 0.694 (0.050) | 0.628 (0.022) |
| Test AUC | 0.656 | 0.698 | 0.677 | 0.645 |
| CV Sensitivity (SD) | 0.528 (0.113) | 0.678 (0.063) | 0.358 (0.068) | 0.454 (0.058) |
| Test Sensitivity | 0.586 | 0.655 | 0.379 | 0.483 |
| CV Specificity (SD) | 0.758 (0.039) | 0.616 (0.158) | 0.831 (0.095) | 0.758 (0.070) |
| Test Specificity | 0.622 | 0.711 | 0.889 | 0.733 |

Merged Representations

| | $D_T + R_T$ | $D_P + R_P$ | $D_T + D_P$ | $R_T + R_P$ | $D_T + D_P + R_T + R_P$ |
|---|---|---|---|---|---|
| CV AUC (SD) | 0.741 (0.033) | 0.718 (0.059) | 0.727 (0.025) | 0.683 (.033) | 0.728 (0.036) |
| Test AUC | 0.719 | 0.696 | 0.719 | 0.693 | 0.723 |
| CV Sensitivity (SD) | 0.510 (0.137) | 0.564 (0.080) | 0.566 (0.092) | 0.605 (0.074) | 0.529 (0.036) |
| Test Sensitivity | 0.655 | 0.759 | 0.759 | 0.586 | 0.724 |
| CV Specificity (SD) | 0.771 (0.015) | 0.712 (0.126) | 0.687 (0.117) | 0.710 (0.054) | 0.747 (0.104) |
| Test Specificity | 0.644 | 0.644 | 0.644 | 0.667 | 0.622 |

FIG. 13

DISEASE CHARACTERIZATION AND RESPONSE ESTIMATION THROUGH SPATIALLY-INVOKED RADIOMICS AND DEEP LEARNING FUSION

CROSS REFERENCE TO RELATED APPLICATIONS

This application claims the benefit of U.S. Provisional Patent Application No. 62/908,072 filed Sep. 30, 2019, entitled "DISEASE CHARACTERIZATION AND RESPONSE ESTIMATION THROUGH SPATIALLY-INVOKED RADIOMICS AND DEEP LEARNING FUSION", the contents of which are herein incorporated by reference in their entirety.

FEDERAL FUNDING NOTICE

This invention was made with government support under the grant(s) CA199374, CA202752, CA208236, CA216579, CA220581, CA221383, CA239055, RR012463 awarded by the National Institutes of Health; grant IBX004121A awarded by the United States Department of Veterans Affairs; and grant(s) W8IXWH-15-1-0558, W8IXWH-18-1-0440, and W8IXWH-16-1-0329, awarded by the United States Department of Defense.

BACKGROUND

Neoadjuvant chemotherapy (NAC), administered prior to surgery to reduce tumor burden, constitutes the first line of treatment for many breast cancer patients, including locally advanced breast cancer. However, a large portion of NAC recipients will ultimately fail to achieve pathological complete response (pCR): the absence of residual invasive disease within the breast following surgery and a strong marker of favorable outcome. There is currently a need for pre-treatment markers predictive of pCR in order to better target NAC based on likely therapeutic outcome and reduce overtreatment among patients unlikely to respond.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

FIG. 4 illustrates a table showing patient characteristics for the training (Left) and testing (Right) sets, in connection with various aspects discussed herein.

FIG. 6 illustrates a table showing descriptions and biological significance of the radiomic features employed in the example use case, in connection with various aspects discussed herein.

FIG. 7 illustrates a table providing details of the deep learning model of the example use case, in connection with various aspects discussed herein.

FIG. 10 illustrates a table showing subset analysis by site and receptor subtype for the example use case, in connection with various aspects discussed herein.

FIG. 11 illustrates a table showing performance based on MRI acquisition parameters for the example use case, in connection with various aspects discussed herein.

FIG. 12 illustrates a table showing the performance of models of the example use case, in connection with various aspects discussed herein.

FIG. 13 illustrates a table showing AUC, sensitivity, and specificity for different individual and combined models of the example use case, in connection with various aspects discussed herein.

DETAILED DESCRIPTION

Various embodiments discussed herein can train and/or employ a machine learning classifier to predict a prognosis (e.g., response or non-response to a given treatment) based on a combination of radiomic features and deep learning. Various embodiments can combine both radiomic features and deep learning from both an intra-tumoral region and a peri-tumoral region.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
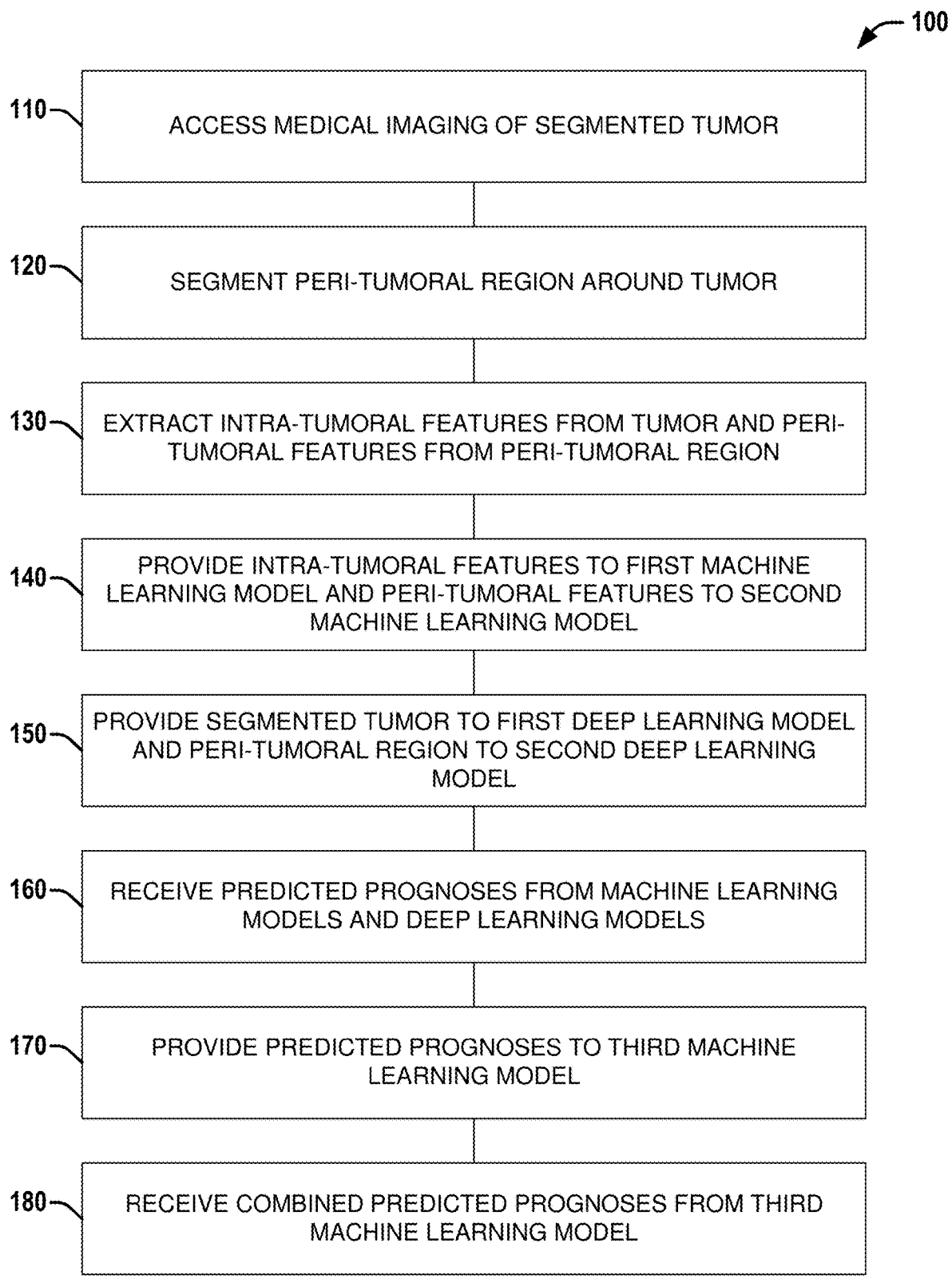
FIG. 1 illustrates a flow diagram of an example method/set of operations that can be performed by one or more processors to predict a prognosis for a potential treatment to a tumor based on a combination of radiomic features and deep learning, according to various embodiments discussed herein.

Referring to FIG. 1, illustrated is a flow diagram of an example method/set of operations 100 that can be performed by one or more processors to predict a prognosis for a potential treatment to a tumor based on a combination of radiomic features and deep learning, according to various embodiments discussed herein. Processor(s) can include any combination of general-purpose processors and dedicated processors (e.g., graphics processors, application processors, etc.). The one or more processors can be coupled with and/or can include memory or storage and can be configured to execute instructions stored in the memory or storage to enable various apparatus, applications, or operating systems to perform the operations. The memory or storage devices may include main memory, disk storage, or any suitable combination thereof. The memory or storage devices can comprise—but is not limited to—any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 can comprise, at 110, accessing a medical imaging scan (e.g., MRI (contrast MRI, etc.), CT, etc.) of a segmented tumor (e.g., segmented via expert annotation, computer segmentation (e.g., via deep learning, etc.), etc.). In various embodiments and in the example use case discussed below, the medical imaging scan can be obtained via a system and/or apparatus implementing the set of operations 100, or can be obtained from a separate medical imaging system (e.g., a MRI system/apparatus, a CT system/apparatus, etc.). Additionally, the medical imaging scan can be accessed contemporaneously with or at any point prior to performing the set of operations 100.

The set of operations 100 can further comprise, at 120, segmenting a peri-tumoral region around the tumor.

The set of operations 100 can further comprise, at 130, extracting a first set of radiomic features from the tumor and a second set of radiomic features from the peri-tumoral region.

The set of operations 100 can further comprise, at 140, providing the first set of radiomic features to a first machine learning model and the second set of radiomic features to a second machine learning model.

The set of operations 100 can further comprise, at 150, providing the segmented tumor to a first deep learning model and the segmented peri-tumoral region to a second deep learning model.

The set of operations 100 can further comprise, at 160, receiving a first predicted prognosis for the tumor from the first machine learning model, a second predicted prognosis for the tumor from the second machine learning model, a third predicted prognosis for the tumor from the first deep learning model, and a fourth predicted prognosis for the tumor from the second deep learning model.

The set of operations 100 can further comprise, at 170, providing the first predicted prognosis, the second predicted prognosis, the third predicted prognosis, and the fourth predicted prognosis to a third machine learning model.

The set of operations 100 can further comprise, at 180, receiving a combined predicted prognosis for the tumor from the third machine learning model.

Figure 2:
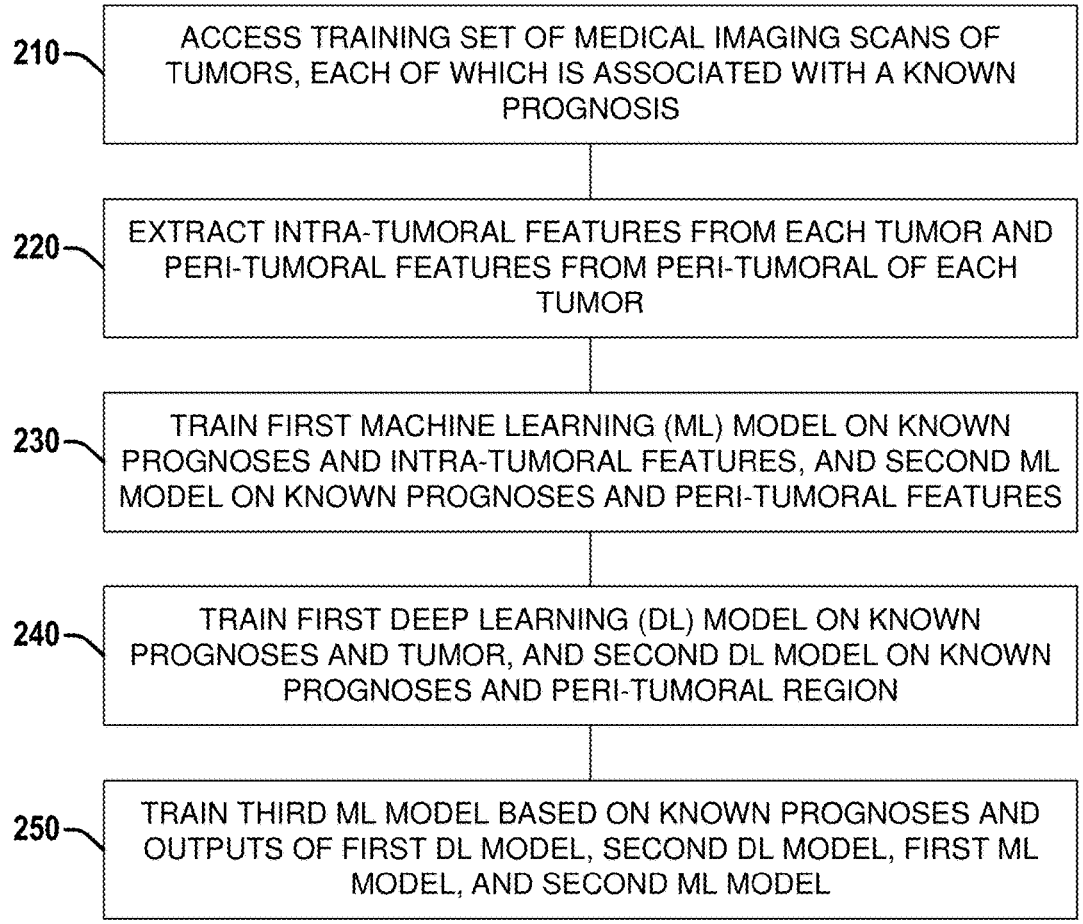
FIG. 2 illustrates a flow diagram of an example method/set of operations that can be performed by one or more processors to train a machine learning classifier to generate a predicted prognosis for a tumor based on a combination of radiomic features and deep learning, according to various aspects discussed herein.

Referring to FIG. 2, illustrated is a flow diagram of an example method/set of operations 200 that can be performed by one or more processors to train a machine learning classifier to generate a predicted prognosis for a tumor based on a combination of radiomic features and deep learning, according to various aspects discussed herein.

The set of operations 200 can comprise, at 210, accessing a training set of medical imaging scans of segmented tumors that are each associated with a known prognosis (e.g., post-treatment outcome, etc.). In various embodiments and in the example use case discussed below, the training set of medical imaging scans can be obtained via a system and/or apparatus implementing the set of operations 200, or can be obtained from a separate medical imaging system. Additionally, the training set can be accessed contemporaneously with or at any point prior to performing the set of operations 200.

The set of operations 200 can further comprise, at 220, extracting a first set of radiomic features from the associated tumor of each medical imaging scan of the training set, and a second set of radiomic features from an associated peri-tumoral region around the associated tumor.

The set of operations 200 can further comprise, at 230, training a first machine learning model based on the associated known prognosis and the first set of radiomic features of each medical imaging scan, and training a second machine learning model based on the associated known prognosis and the second set of radiomic features of each medical imaging scan.

The set of operations 200 can further comprise, at 240, training a first deep learning model based on the associated known prognosis and the associated tumor segmented on each medical imaging scan, and training a second deep learning model based on the associated known prognosis and the associated peri-tumoral region of each medical imaging scan.

The set of operations 200 can further comprise, at 250, training a third machine learning model based on the associated known prognosis for each medical imaging scan and on associated outputs from the first machine learning model, the second machine learning model, the first deep learning model, and the second deep learning model.

Additional aspects and embodiments are discussed below in connection with the following example use case.

Example Use Case: A Combination of Radiomic Features and Deep Learning across the Tumor Habitat is Associated with Likelihood of Response to Neo-Adjuvant Chemotherapy from Pre-Treatment Breast DCE-MRI The following discussion provides example embodiments in connection with an example use case involving training, validation, and testing of models to generate a prognosis (likelihood of treatment response) of breast cancer based on a combination of radiomic features and deep learning.

Summary: A combination of deep learning and radiomic-based texture representations deployed in different spatial compartments of the tumor more effectively predicts response from pre-treatment breast magnetic resonance imaging (MRI) than radiomics or deep learning alone. Radiomic and deep learning representations extract complementary predictive information in different regions of the tumor habitat (e.g. inside and immediately outside the tumor) that can differentiate between breast cancer patients who will achieve a pathologic complete response (pCR) from those who will not on pre-treatment dynamic contrast-enhanced (DCE)-MRI. The combination of different representations from deep learning and radiomics extracted from different tumor compartments yielded the highest predictive accuracy (AUC=0.723) on the test set (N=74).

Background: Radiomics and deep learning analysis of tumor on MRI have individually shown promise in predicting response to neoadjuvant chemotherapy (NAC) in the context of breast cancer. The combination of these different representations across multiple regions of the tumor habitat (e.g. the tumor itself and the peri-tumoral region) might provide a more accurate imaging signature that can better predict therapeutic outcomes from pre-treatment dynamic contrast-enhanced (DCE) MRI of the breast.

Purpose: To evaluate the combination of deep learning (DL) and radiomic feature representations, based on their relative strength across the tumor and peritumoral environment on pre-treatment dynamic contrast-enhanced (DCE) MRI scans for predicting response to NAC, where response is defined as the complete absence of residual invasive disease within the breast following post-treatment surgery.

Materials and Methods: For the first example use case, 1.5 tesla (T) or 3T pre-treatment breast DCE-MRI scans were collected for 210 female patients (mean age, 50 years; range, 23-79), with 82 achieving pathological complete response (pCR) following surgery, from two institutions between April, 2012 and April, 2017. Patients were randomly divided in a 2:1 ratio into training (N=136) and testing (N=74) sets. The intra-tumoral region (IT) was annotated manually, and a peri-tumoral region (PT) 3 mm from the tumor boundary was derived. For each of these regions, a convolutional neural network (CNN) with five blocks and a machine learning classifier using radiomic texture features (chosen from a set of 495 features including Gabor and Laws filter response, and gray level co-occurrence matrix-based features) were trained and assessed via 3-fold cross-validation. A logistic regression classifier was then trained to combine representations across regions (IT DL, IT radiomics, PT DL, PT radiomics) and evaluated on the independent testing set.

Results: The combined model incorporated predictions from multiple computational representations applied across different spatial regions to identify pCR with an AUC of 0.72 in testing, which outperformed individual radiomic (AUC IT=0.67 and PT=0.64) and DL representations (AUC IT=0.65 and PT=0.69). Additionally, combining both representations within one region, as well as one representation applied to both regions, showed improvement over individual representations within one region. Non-pCR was characterized by elevated expression of GLCM texture features quantifying enhancement heterogeneity, while the CNN emphasized necrotic sub-compartments of the IT and PT regions.

Conclusion: Radiomic and deep learning representations extract unique predictive information across the tumor habitat. A strategy combining multiple computational imaging representations and tumor regions predicted pCR better than strategies considering a single representation or tumor compartment.

Overview

Neoadjuvant chemotherapy (NAC), administered prior to surgery to reduce tumor burden, constitutes the first line of treatment for many breast cancer patients, including locally advanced breast cancer. However, a large portion of NAC recipients will ultimately fail to achieve pathological complete response (pCR): the absence of residual invasive disease within the breast following surgery and a strong marker of favorable outcome. There is currently a need for pre-treatment markers predictive of pCR in order to better target NAC based on likely therapeutic outcome and reduce overtreatment among patients unlikely to respond.

Computational image analysis has shown considerable promise for the prediction of therapeutic response in breast cancer. Two quantitative image analytic approaches, radiomics and deep learning, have each shown success in predicting NAC outcome from pre-treatment breast dynamic contrast-enhanced (DCE)-MRI. However, these representations differ considerably in the method by which they characterize disease phenotypes on radiographic imaging. Radiomics extracts and quantifies various explicitly-defined algorithmic features (e.g., image texture, etc.) within a region of interest (ROI). Conversely, deep learning approaches in medical imaging generally involve training a convolutional neural network (CNN), which iteratively learns a series of convolution-based filtering operations to extract novel features, reduce feature dimensionality, and predict response through backpropagation. Consequently, these analytic techniques may provide distinct and complementary representations of a tumor's imaging phenotype.

Recent findings have shown that supplementing radiomic features extracted from the tumor with texture features from the peritumoral region enables improved prediction of pathological response from targeted therapy using breast DCE-MRI. The importance of the peritumoral region has also been observed in the context of predicting metastasis within both breast ultrasound and lung CT, as well as distinguishing adenocarcinomas from granulomas in lung CT. This suggests that unique biologic information pertinent to therapeutic response can be found not only by characterizing heterogeneity across the tumor, but also within the peritumoral region, which includes response-relevant biology such as tumor-associated vasculature, immune infiltration, and lymphatics.

Given the differing nature of radiomic and deep learning representations, their relative strengths may vary across different compartments of the tumor habitat. The example use case investigated (1) whether different representations (radiomics and DL) are better suited for different parts of the tumor habitat, and (2) whether an integrated signature combining computational imaging representations across tumor compartments will more accurately predict NAC response.

Deep learning and radiomic classifiers were separately trained within both the intratumoral (IT) and peritumoral (PT) regions on pre-treatment MRI via a training cohort of 136 patients to predict pCR prior to initiation of NAC. A logistic regression classifier was then trained to combine these individual representations into an ensemble prediction (various embodiments can employ other types of classifiers), fusing radiomics and DL across the IT and PT regions. Response prediction performance was also compared against partial-fusion models, which combined either multiple representations within one spatial region or a single representation across multiple spatial regions. All approaches were independently evaluated on a separate held-out testing cohort of 74 patients.

Figure 3:
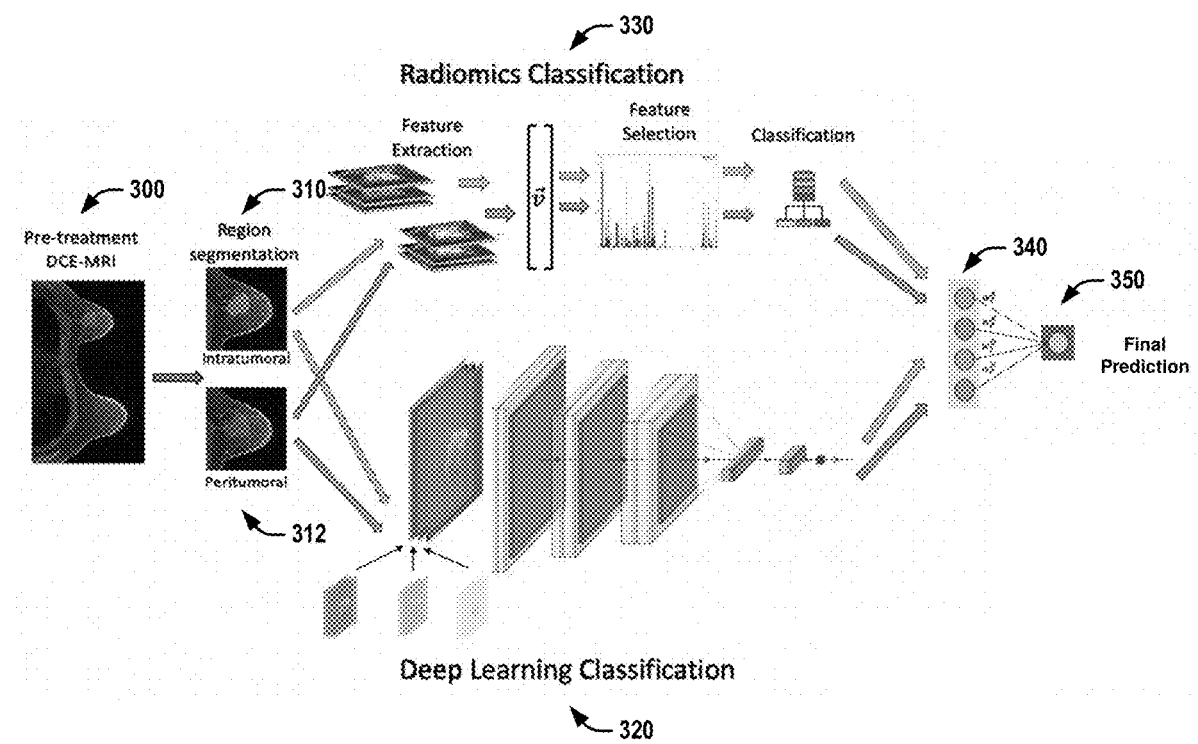
FIG. 3 illustrates an overview of the methodology of the example use case, in connection with various aspects discussed herein.

Referring to FIG. 3, illustrated is an overview of the methodology of the example use case, in connection with various aspects discussed herein. Pre-treatment MRI (300) are segmented into intratumoral (310) and peritumoral regions (312). Deep neural networks (320) and radiomic classifiers (330) are then individually trained on each region. The outputs of each individual spatially oriented classifier are combined using a logistic regression classifier (340) to generate a final prediction (350).

Materials and Methods

Data

The example use case retrospectively analyzed a dataset consisting of axial-plane breast DCE-MRIs of 220 patients with biopsy-proved breast cancer, collected prior to administration of NAC. The data was collected from Institution 1 and Institution 2 over the period of April, 2012 to April, 2017, with the subset from Institution 1 having been previously published. Patients from Institution 1 contain a mix of tumor subtypes and patients from Institution 2 contain only human epidermal receptor 2 (HER2) positive tumors. Referring to FIG. 4, illustrated is a table showing patient characteristics for the training (Left) and testing (Right) sets, in connection with various aspects discussed herein. Characteristics are compared between responsive (pCR) and non-responsive (non-pCR) patients, and corresponding p-values are calculated using Student's t-test for continuous variables and a Chi-squared test for categorical variables.

Figure 5:
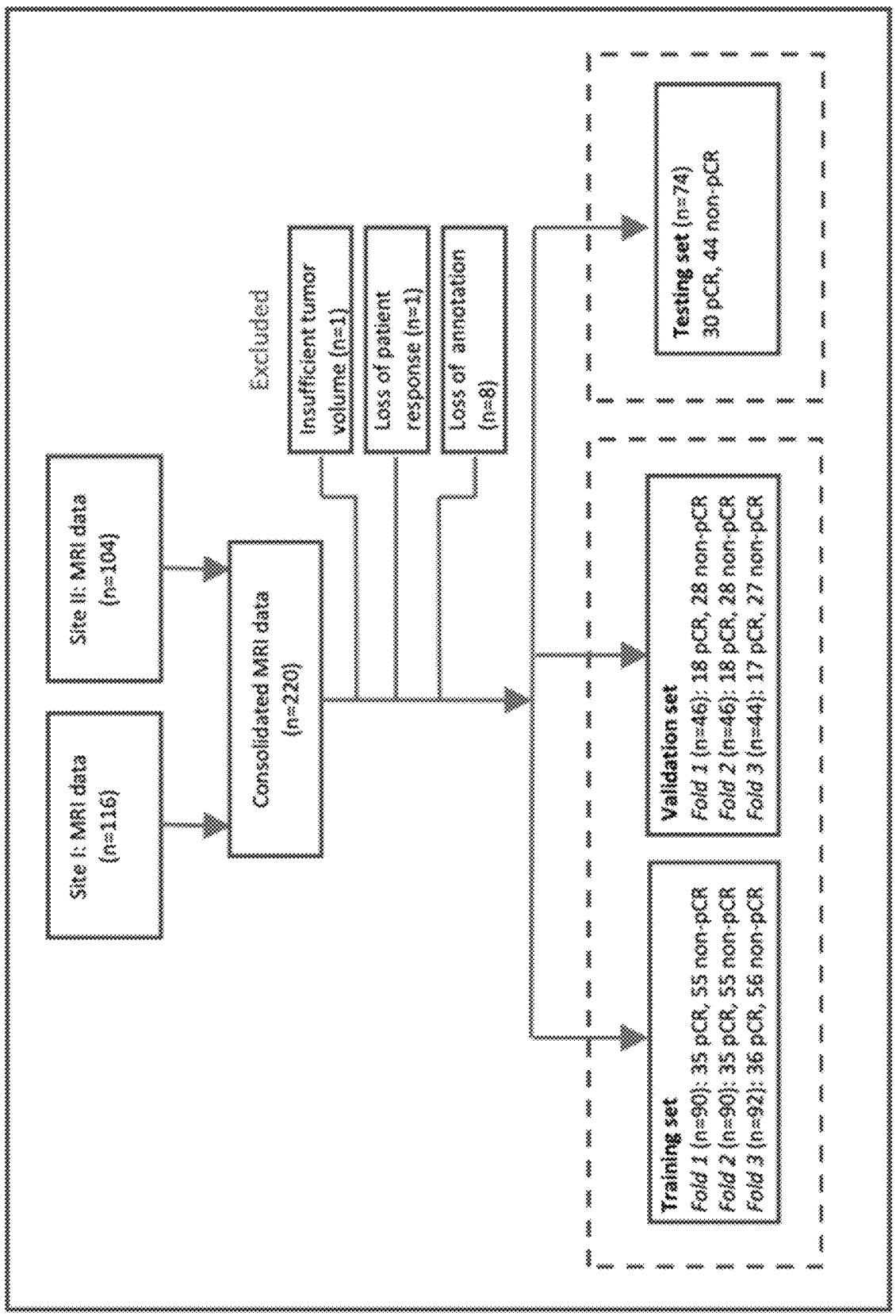
FIG. 5 illustrates a patient selection flowchart showing details on dataset distribution and inclusion/exclusion criteria for the example use case, in connection with various aspects discussed herein.

HER2− patients (n=122) received doxorubicin and cyclophosphamide followed by paclitaxel. All HER2+ patients (n=88) received an NAC regimen consisting of docetaxel, carboplatin, trastuzumab, and/or pertuzumab. Patients with tumor volume less than 0.5 $mm^2$ on the largest annotation slice (N=1), lack of pathologic response labels (N=1), and incomplete imaging and annotation data (N=8) were excluded. The final cohort of 210 patients was randomly stratified into a training set of 136 patients and a held-out testing set of 74 patients. The training set was further partitioned into 3 folds for model training and tuning via cross-validation. Patients were imaged with 1.5 T (n=184) or 3 T (n=26) scanners. Each patient received a pre-contrast baseline scan, and was then injected with a gadolinium-based contrast agent and received five subsequent post-contrast acquisitions. Referring to FIG. 5, illustrated is a patient selection flowchart showing details on dataset distribution and inclusion/exclusion criteria for the example use case, in connection with various aspects discussed herein. Patients from two institutions were consolidated (Top), and various exclusion criteria were applied to the cohort (Middle). The remaining patients were randomly stratified into three folds of training and testing for cross-validation (Bottom, Left) and a held-out testing set (Bottom, Right).

Details regarding image acquisition and patient characteristics are provided in FIG. 5. The example use case was Health Insurance Portability and Accountability Act-compliant and institutional review board-approved, and the need for an informed consent from all patients was waived.

Tumor Habitat Definition

Two spatial regions of interest (ROIs) were defined on each imaging exam for computational analysis: the intratumoral (IT) ROI and the peri-tumoral (PT) ROI. On each DCE-MRI volume, the IT ROI was delineated on the three slices with the largest tumor volume, which were annotated on the phase of peak enhancement by three readers, with multiple years of experience, working in consensus. Peritumoral ROIs were then defined as a 3 mm annular ring surrounding the tumor, generated by expanding the intratumoral mask outward via radial dilation (discussed in greater detail below).

Radiomics

Within each individual region, a total of 99 2D radiomic texture features consisting of 25 Laws energy measures, 48 Gabor features, 13 Haralick features, and 13 Co-occurrence of Local Anisotropic Gradient Orientations (CoLlAGe) features were extracted voxel-wise from the DCE-MRI phase of peak contrast enhancement on all annotated slices. Referring to FIG. 6, illustrated is a table showing descriptions and biological significance of the radiomic features employed in the example use case, in connection with various aspects discussed herein. Five first order statistics—mean, median, standard deviation (SD), skewness, and kurtosis—were computed to describe the distribution of features within each region, resulting in 495 statistical features for each region, which were then normalized between −1 and 1.

Following feature extraction, a set of top features was chosen using a two-part feature selection scheme. First, the feature set was pruned to eliminate correlated features based on a maximum allowable spearman correlation between features, with the retained feature chosen by Wilcoxon rank sum test. Second, 1000 iterations of minimum redundancy maximum relevance (mRMR) feature selection were used to identify a set of top features in cross-validation and train a machine learning classifier. Various configurations of radiomic models were trained, using between 1 and 20 top features and a maximum correlation between 0.5 and 1 in intervals of 0.05. Each configuration was applied to a set of machine learning classifiers: naïve Bayes, support vector machine (SVM) with a linear kernel, SVM with a radial basis function (RBF) kernel, linear discriminant analysis (LDA), and quadratic discriminant analysis (QDA). The optimal radiomic model configuration was determined based on the best performance attained over 1000 iterations of three-fold cross-validation, with hyper-parameters tuned separately for intra-tumoral and peri-tumoral models. The final intra-tumoral radiomic model used an SVM classifier with an RBF kernel, 11 features, and a maximum feature correlation of 0.9, and the peri-tumoral model used a QDA classifier, 8 features, and a maximum feature correlation of 0.9. mRMR feature selection was performed using MATLAB software with the Feature Selection Toolbox for C (FEAST; Czech Academy of Sciences, Prague, Czech Republic), and all above operations were performed in MATLAB release 2018a.

Deep Learning

For each region, the DCE-MRI volume was cropped to three 2D frames around the region of interest (ROI). All voxels outside of the ROI were then filled with the mean intensity value within the ROI to reduce the presence of hard edges at the tumor border. The three cropped frames of the pre-contrast phase were then concatenated channel-wise to two post-contrast phases in temporal order. A deep neural network architecture (320) was created to process these volumes, with a separate model trained for each spatial region. Data augmentation was performed, applying random rotations and spatial zooming, as well as varying temporal sampling from the available DCE-MRI phases to account for variations in acquisition timing (discussed in greater detail below). Only the first three DCE-MRI phases were used when the model was run for inference, such as when the network was evaluated on validation folds and the testing set.

Deep learning models were trained using various custom network architectures (discussed in greater detail below), learning rates ranging from 0.05 to 0.00005, and various optimizers: Adam, stochastic gradient descent (SGD), SGD with momentum, and SGD with Nesterov momentum. The optimal deep learning model was determined via three-fold cross-validation, with hyperparameters tuned separately for intra-tumoral and peri-tumoral models. The final network architecture consisted of five convolutional blocks and inputs of size 146×104×3×3 for the intratumoral model and 150×110×3×3 for the peritumoral model, where the first XY dimensions were determined based upon the largest region of interest in the dataset. Referring to FIG. 7, illustrated is a table providing details of the deep learning model of the example use case, in connection with various aspects discussed herein. The number of training epochs for the final models were determined by averaging the number of epochs used in cross-validation, giving 105 for the intra-tumoral model and 141 for the peri-tumoral model. Both models performed best using a learning rate of 0.00025, with an SGD optimizer with Nesterov momentum of 0.9 and a decay of 0.0000025. All deep learning implementation was performed in Python3, with Keras (version 2.2.4) using tensorflow-gpu backend (version 1.10.0). The regions of the input image which contributed most to response prediction were visually analyzed in a post-hoc fashion using guided backpropagation via keras-vis, which shows the predictive weight of each individual pixel of the input image.

Combined Representations

Each individual model was incorporated into a logistic regression classifier, $p_\mathcal{L}$, which fused the predictions of the four individual classifiers: radiomics and deep learning, {R, D}, invoked intra- and peri-tumorally, {T, P}. Each classifier was first trained independently, with $\mathcal{L}$ then being trained using the output predictions of each individual classifier according to equation (1):

$$\ln\left(\frac{p_\mathcal{L}}{1-p_\mathcal{L}}\right) = W_0 + \sum_{n=1}^{N} W_n p_S^C \quad (1)$$

where $p_S^C$ represents a response prediction output for classifier C in region S, and $p_\mathcal{L}$ represents a response prediction output for $\mathcal{L}$. This fusion approach allows $\mathcal{L}$ to learn a weighted combination between patient predictions from each classifier based on the relative strengths of representation and location, giving the ability for a stronger ensemble prediction.

Prior to fusion, region-specific radiomic and deep learning classifiers, $C_S$, were optimized via 3-fold cross-validation within the training set. For evaluating the fusion model in cross validation, $\mathcal{L}_{CrossVal}$, the validation fold predictions from each individual model, $p_S^C$, were accumulated into a set of response predictions, $p_{CrossVal}$, representing the whole training set across all individual models. The logistic regression model weights were then trained based on p from training folds and evaluated on p from validation folds. The final fusion model, $\mathcal{L}_{Test}$, was trained on the accumulated $p_{CrossVal}$ from the validation sets for the full training set. Each of $p_S^C$ was then re-trained across the full training set with the optimal hyper-parameters discovered in cross-validation, and then applied to the testing set. The testing set predictions from each model were then used as input to $\mathcal{L}_{Test}$.

Statistical Analysis

Performance of the individual models and the fused model were compared by area under the receiver operating characteristic curve (AUC), as well as the accuracy, sensitivity, and specificity evaluated at an operating threshold of 0.5. The importance of each individual model within the fused ensemble was then analyzed by comparing the weights within the logistic regression classifier, which each correspond to one of the individual model's predictions.

An unsupervised hierarchical clustering was performed on patients in the testing set based on agreement in binary predictions between classifiers to identify subsets of patients where particular representations or regions were especially discriminative.

For each of the trained models, the significance of the AUC was analyzed via 50,000 iteration permutation testing, providing 95% confidence intervals (CI) and p values for each measurement.

Results

Figure 8:
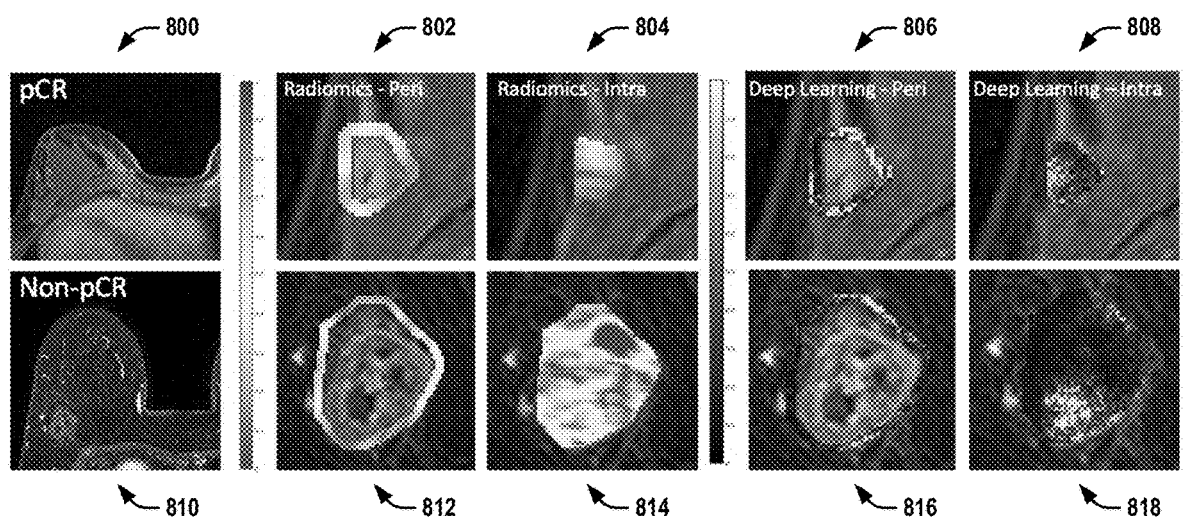
FIG. 8 illustrates example images showing constituent representations of the fusion mode, in connection with various aspects discussed herein.

Experiment 1: Radiomics- and Deep-Learning-Based Representations within Individual Tumor Compartments The performances of radiomics and deep learning representations were evaluated individually within a single region. Referring to FIG. 8, illustrated are example images showing constituent representations of the fusion mode, in connection with various aspects discussed herein. The top row (800-808) shows example images and analysis for a pCR patient (with segmented scan at 800), and the bottom row (810-818) shows the same for a non-pCR patient (with segmented scan at 810). Radiomics feature maps (e.g., 802, 804, 812, and 814) show increased expression of high frequency Gabor features within both the peri- and intra-tumoral regions distinguished non-response. Visual attention maps (e.g., 806, 808, 816, and 818) show the intra-tumoral CNN emphasizes tumor border and core in patients who achieved pCR and the peri-tumoral CNN emphasizes specific regions of the annular band.

The radiomics model achieved an AUC of 0.694+/−0.050 in cross-validation and 0.677 in testing when applied intratumorally (804 and 814), and 0.628+/−0.022 in cross-validation and 0.645 in testing when applied peritumorally (802 and 812). Correspondingly, the deep learning model achieved an AUC of 0.709+/−0.043 in cross-validation and 0.656 in testing when applied intratumorally (808 and 818), and 0.709+/−0.047 in cross-validation and 0.698 in testing when applied peritumorally (806 and 816).

Next, the combination of both deep learning and radiomics representations within a single spatial region at a time was assessed by combining the models using a logistic regression classifier. When combining both representations within the intra-tumoral region, a cross-validation AUC of 0.741+/−0.033 and a test set AUC of 0.719 (95% CI=0.59-0.84, p=0.0004) was achieved. The same combination applied to the peri-tumoral region achieved a cross-validation AUC of 0.718+/−0.059 and a test set AUC of 0.696

(95% CI=0.56-0.83, p=0.003). The intra-tumoral model achieved large performance benefits when taking advantage of both representations, achieving a test set increase of 0.042 AUC from the best individual model, intra-tumoral radiomics. However, the best individual peri-tumoral model, peri-tumoral radiomics, showed no additional performance benefit when adding a deep learning counterpart.

Experiment 2: Combining Representations Across Intra- and Peri-Tumoral Compartments The benefits of including both the intra-tumoral and peri-tumoral regions during response prediction were first evaluated separately for individual representations, and then for the full fused model. The effect of combining both spatial regions and both representations within a single model was then evaluated. A radiomics model, composed of radiomic classifiers invoked within the intra-tumoral and peri-tumoral regions, achieved a cross-validation AUC of 0.683+/−0.033 and a test set AUC of 0.693 (95% CI=0.57-0.82, p=0.002). The deep learning counterpart, consisting of deep learning representations invoked within the intra-tumoral and peri-tumoral regions, achieved a cross-validation AUC of 0.727+/−0.025 and a test set AUC of 0.719 (95% CI=0.59-0.85, p=0.001). Both representations achieved performance benefits when taking advantage of both spatial regions.

Combining all four spatially oriented classifiers, deep learning and radiomics invoked intra- and peri-tumorally, provided better ability to predict pCR than any individual or pair-wise classifier, obtaining an AUC of 0.728+/−0.036 in cross-validation and 0.723 in the testing set. Confidence intervals (CI) and p values were computed via 50,000 iteration permutation testing, giving a 95% testing set CI=0.60-0.85, p=0.0005. It was found that intra-tumoral radiomics and peri-tumoral deep learning were most influential, with weights of 1.56 and 1.22 respectively. Intra-tumoral deep learning and peri-tumoral radiomics were shown to be of lesser importance, however still influential, with weights of 1.06 and 0.94 respectively.

Figure 9:
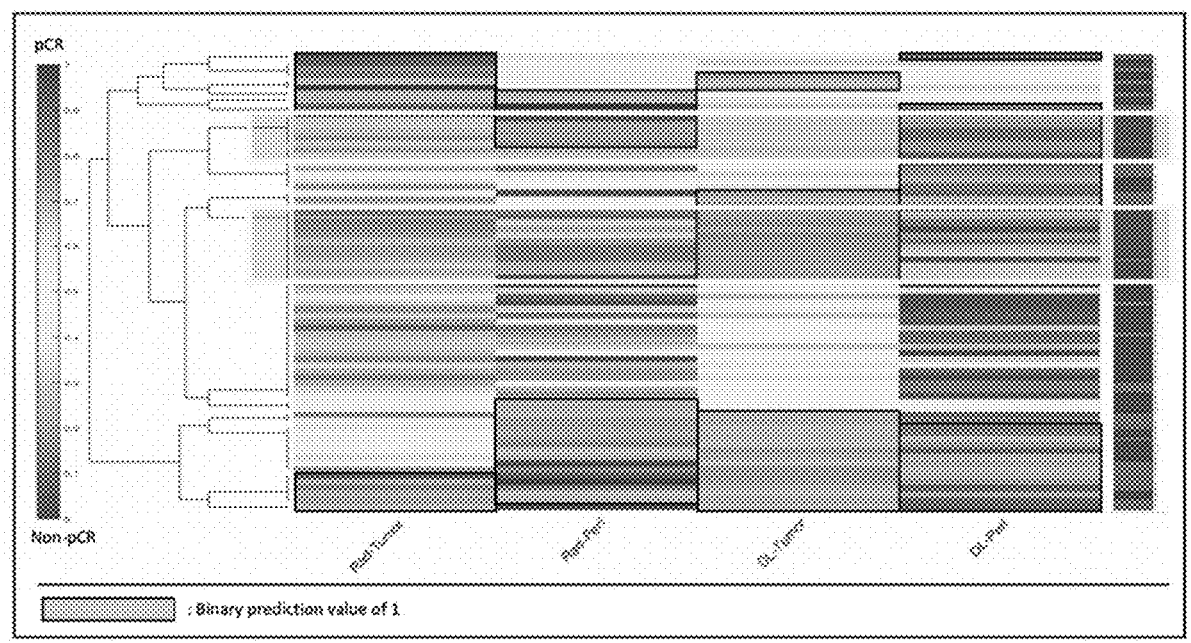
FIG. 9 illustrates a chart showing a hierarchical clustering algorithm which grouped patients based on classifier agreement, in connection with various aspects discussed herein.

Referring to FIG. 9, illustrated is a chart showing a hierarchical clustering algorithm which grouped patients based on classifier agreement, in connection with various aspects discussed herein. FIG. 9 shows specific groups of patients where an ensemble outperforms single-region and single-representation models. An unsupervised hierarchical clustering algorithm was employed to group patients based on the agreement between binary predictions of individual classifiers shows a clear separation between groups where the classifiers generally agreed on prediction (bottom half) and those where they differed (top half). In the top half of the patients, the ensemble classifier provides an advantage over any individual approach by being able to weight the classifiers based on respective strengths. The top highlighted region shows a group of patients where the intratumoral radiomics and intratumoral deep learning drive the classifier towards an accurate prediction of non-pCR, and the bottom highlighted region shows a group of patients where the intratumoral deep learning does poorly, but the other three classifiers carry the prediction.

Figure 10:
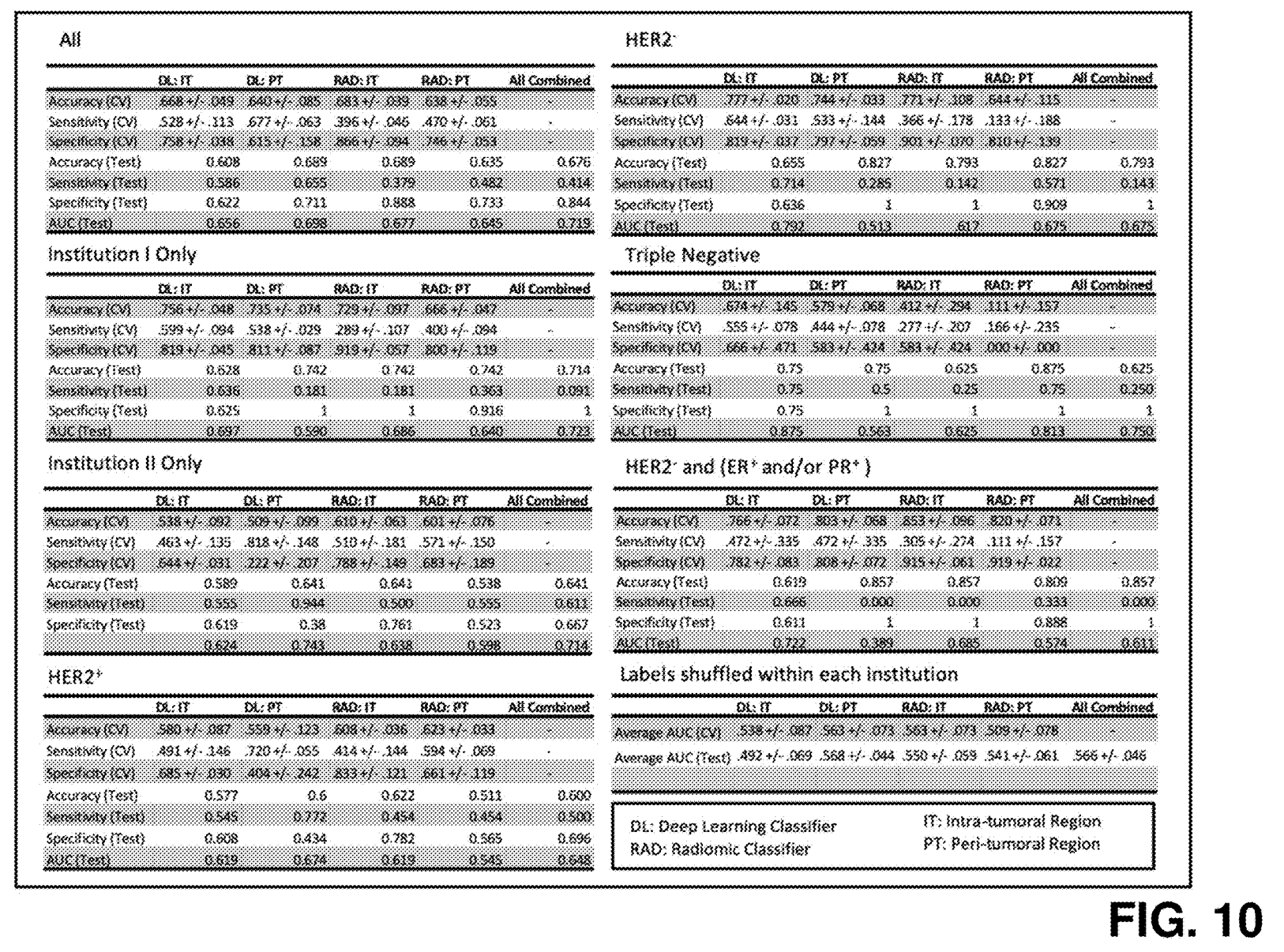

Experiment 3: Influence of Clinical Parameters, MRI Acquisition, and Tumor Segmentation When stratified into four receptor subtype groups (HER2+, n=122; HER2−, n=88; Luminal, n=70; TN, n=20), the accuracy of each classifier was found to decrease slightly in the HER2+ and increase in the other groups. Referring to FIG. 10, illustrated is a table showing subset analysis by site and receptor subtype for the example use case, in connection with various aspects discussed herein. A second experiment to assess whether institutional differences could be driving model predictions, involving shuffling response labels within institutions and recomputing AUC, consistently showed that predictions from institutional differences alone was not significantly better than random. Additionally, performance was measured within subgroups of MRI acquisition parameters, including as slice thickness, resolution, and scanner strength, which showed consistent performance across subgroups. Referring to FIG. 11, illustrated is a table showing performance based on MRI acquisition parameters for the example use case, in connection with various aspects discussed herein.

The effect of annotation shape and accuracy on the resulting representations was tested by applying the proposed methodology to a set of automatically-generated annotations. For each patient, active contour segmentation was initialized with a box ROI surrounding the original annotation to segment the tumor without any patient-wise segmentation parameter tuning or manual mask correction, in order to test the hypothesis in a "worst-case" setting without expert annotations. From automated tumor segmentations, the peritumoral region was extracted using a procedure discussed in greater detail below. Each model was then re-trained using these unaltered annotations, and results were compared to the hand-annotation counterparts. While performance was reduced relative to the model trained using expert annotations, trends in model performance showing the benefit of fusing representations across spatial regions (AUC=0.660) relative to the individual models (AUCs=0.551-0.617) remained consistent. Referring to FIG. 12, illustrated is a table showing the performance of models of the example use case, in connection with various aspects discussed herein.

Discussion

A large proportion of NAC recipients fail to achieve pCR, leading to unnecessary side effects and detriments to quality of life without therapeutic benefit. Accordingly, a way to predict pCR prior to treatment would enable better targeting of NAC and reduce overtreatment. Radiomic textural analysis and deep convolutional neural networks have both shown promise in addressing this problem, but previous studies have typically limited their focus to a single one of these representations applied within the tumor itself. The question of how these tools can be best applied and combined across the tumor and tumor habitat remained underexplored. The example use case investigated the ability of deep learning and radiomic feature representations applied within the tumor and its surrounding environment on pretreatment breast DCE-MRI to predict pCR to NAC. It was found that each representation played differentially important roles in different parts of the tumor habitat, and that unique predictive value could be captured by combining radiomic and deep learning representations applied to the tumor and tumor habitat.

Experiment 1 tested the relative contributions of radiomic and deep learning representations when applied to a single region of the tumor habitat. Performance was increased with respect to the intratumoral region when combining both representations, but no additional benefit was found in the peritumoral region. These findings agree with one study applying the proposed methodology to a smaller subset of patients from a single institution. Additionally, these findings agree with other studies successfully combining intratumoral deep learning and radiomics for prediction of breast lesion and lung nodule malignancy, respectively. However, this work differs from these previous approaches by combining feature representations based on relative strengths, instead of equally weighting each representation.

In experiment 2, the benefit of applying representations across multiple regions of the tumor environment was evaluated. Including the peritumoral region during quantitative analysis has been shown to improve radiomics approaches in a wide range of clinical and imaging contexts, for instance, in breast and lung cancer. Performance was increased when evaluating representations within both the tumor and its surrounding environment, in comparison to isolating only one region. These findings agree with one study that found an increase in performance when including peritumoral features during radiomic prediction of pCR. The best performance was achieved with a full model combining radiomics and deep learning across both regions, with the resulting representation providing better ability to predict pCR than any individual model or pairwise combination. A distinct benefit was observed from considering both multiple representations and multiple spatial regions in the context of pCR prediction to NAC in pre-treatment breast DCE-MRI.

The retrospective study was limited to two institutions, and can be supported by further external confirmation. While the cohort was heterogeneous and included patients from multiple institutions with differing acquisition protocols and distributions of HER2+ tumors, it was promising that robust performance was observed between institutions, receptor subtypes, and acquisition parameters. The limited size of the training cohort also constrained the complexity of the machine learning models; in particular the DL models, which were limited to relatively straightforward CNN models to prevent overfitting. Nonetheless, the example use case is among the largest studies on machine learning-based NAC response prediction to date. The example use case also employed manual annotations of the tumor boundary to delineate the tumor and peritumoral regions, which could introduce inter-reader variability. Encouragingly, however, in an experiment in which "worst-case" annotations were computationally generated with no expert supervision and then used to re-create individual and combined classification models, the performance benefits of combining predictions across multiple representations and regions was consistent. See FIG. 12, comparing the performance of models of the example use case for manual and computer-generated annotations.

Referring to FIG. 13, illustrated is a table showing AUC, sensitivity, and specificity for different individual and combined models of the example use case, in connection with various aspects discussed herein.

In conclusion, the example use case demonstrated the utility of combining deep learning and radiomic feature representations applied within the tumor and its surrounding environment for prediction of pCR to NAC in pre-treatment breast DCE-MRI. The results indicate that different representations invoked in different spatial regions contain unique information, and combining these representations can provide an advantage over traditional approaches.

Additional Information

Network Architectures Tested

Two groups of network architectures were considered: benchmark deep convolutional neural networks and custom shallower neural networks. From the first set, AlexNet, DenseNet, ResNet50, and VGG16 were evaluated. For each of these networks, overfitting occurred due to the depth of the network architectures and the relatively small set of image data being used in this application. Following this, a second set of shallower custom network architectures were evaluated, varying parameters such as the number of convolutional blocks, the number of convolutional layers per block, dropout levels, the addition of batch normalization, and the size of the dense block. The number of convolutional blocks used was varied between 3 and 5 (e.g., although larger numbers of blocks such as 6, 7, etc. can be employed in various embodiments). Within each of these blocks, 2 convolutional layers were typically used, but adding an additional layer to the last blocks and removing a layer from the first blocks was also evaluated. The number of filters used per layer was extensively evaluated, trying 4-5 different configurations for the base layer, and increasing the number of filters for subsequent layers by different factors. Additionally, the effect of batch normalization between each convolutional block, and dropout at the end of the network, was tested. The number of dense layers used varied between 1 and 3, and the effect of increasing/decreasing the number of filters on each dense layer was evaluated. The optimal configuration was determined via 3-fold stratified cross-validation within the training set.

Effect of Annotation Shape on Resulting Representations

The effect of annotation shape and accuracy on the resulting representations was tested by applying the proposed methodology to a set of automatically-generated annotations. For each patient, a set of tumor boundaries were automatically delineated using an active contour approach. The segmentation model was initialized from a square ROI containing the initial manual annotation boundaries. The peritumoral region was automatically derived using the same method as described in greater detail below. Each model was then re-trained using these unaltered annotations, and results were compared to the hand-annotation counterparts (see FIG. 12).

The performance of using expert human annotations were compared to computational annotations. AUC values are provided in FIG. 12 for each spatial-specific classifier, as well as the ensemble of all four individual models. The results show a decrease in performance when using computational annotations, but the same general trend holds, with the fused model significantly out-performing any individual model.

Extraction of Peritumoral Region

The peritumoral region's annotation was generated by expanding each image frame's intratumoral annotation outward via radial dilation. The intratumoral mask was dilated using a disk-shaped structuring element with a radius of 3 mm (although other radii can be used in various embodiments, e.g., 2-4 mm, 1-5 mm, etc.). The original mask was then subtracted from this dilated version to generate the peritumoral band. This procedure was repeated for each frame of the 3-dimensional tumor volume.

Data Augmentation Procedure

For the deep learning models, training data was spatially augmented via rotation, zooming, and axis flipping. For an arbitrary input image, there was a 50% chance of each augmentation operation being applied, independent of one another. The degree of rotation was randomly sampled in the range [−45°,45°], and the magnitude of zooming was randomly sampled in the range [1×,2×]. Random flipping occurred horizontally and vertically.

In addition to spatial augmentation, a temporal augmentation procedure was performed to allow the neural network to learn time-based information. The fourth dimensional input to the network allowed for multiple volumes, taken at different time points in acquisitioning, to be passed into the network for a single training input. However, the time delays between acquisitions was not consistent across all patients, introducing a potential source of overfitting. To prevent this, each training input randomly sampled 3 of 5 potential acquisition time-points, sorted them in chronological order, and used these as the fourth-dimensional input to the network. This allowed for the network to pick up potential signal occurring across acquisitioning, while being resistant to the specific timing between acquisitions.

Additional Embodiments

In various example embodiments, method(s) discussed herein can be implemented as computer executable instructions. Thus, in various embodiments, a computer-readable storage device can store computer executable instructions that, when executed by a machine (e.g., computer, processor), cause the machine to perform methods or operations described or claimed herein including operation(s) described in connection with methods 100, 200, or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different embodiments, the example methods or operations described herein can be triggered in different ways. In one embodiment, a method or operation can be triggered manually by a user. In another example, a method or operation can be triggered automatically.

Embodiments discussed herein relate to training and/or employing models or classifiers to determine a prognosis (e.g., responsiveness to a potential treatment) for a tumor based on a combination of radiomic features and deep learning, based at least in part on features of medical imaging scans (e.g., MRI, CT, etc.) that are not perceivable by the human eye, and involve computation that cannot be practically performed in the human mind. As one example, machine learning classifiers and/or deep learning models as described herein cannot be implemented in the human mind or with pencil and paper. Embodiments thus perform actions, steps, processes, or other actions that are not practically performed in the human mind, at least because they require a processor or circuitry to access digitized images stored in a computer memory and to extract or compute features that are based on the digitized images and not on properties of tissue or the images that are perceivable by the human eye. Embodiments described herein can use a combined order of specific rules, elements, operations, or components that render information into a specific format that can then be used and applied to create desired results more accurately, more consistently, and with greater reliability than existing approaches, thereby producing the technical effect of improving the performance of the machine, computer, or system with which embodiments are implemented.

Figure 14:
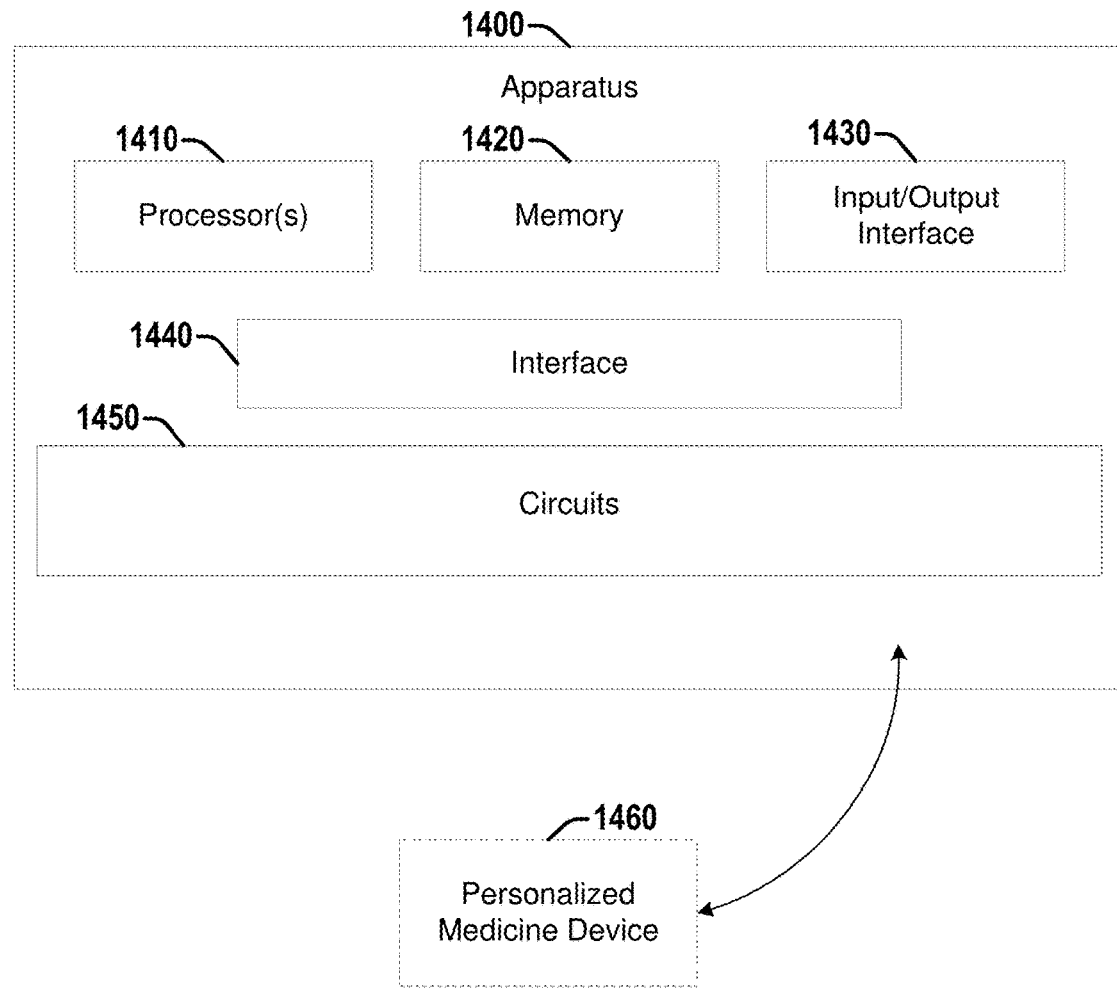
FIG. 14 illustrates a diagram of an example apparatus that can facilitate training and/or employing a machine learning classifier to determine a prognosis (e.g., predicted response to treatment, etc.) based on a combination of radiomic features and deep learning, according to various embodiments discussed herein.

Referring to FIG. 14, illustrated is a diagram of an example apparatus 1400 that can facilitate training and/or employing a machine learning classifier to determine a prognosis (e.g., predicted response to treatment, etc.) based on a combination of radiomic features and deep learning, according to various embodiments discussed herein. Apparatus 1400 can be configured to perform various techniques discussed herein, for example, various operations discussed in connection with sets of operations 100 and/or 200. Apparatus 1400 can comprise one or more processors 1410 and memory 1420. Processor(s) 1410 can, in various embodiments, comprise circuitry such as, but not limited to, one or more single-core or multi-core processors. Processor(s) 1410 can include any combination of general-purpose processors and dedicated processors (e.g., graphics processors, application processors, etc.). The processor(s) can be coupled with and/or can comprise memory (e.g., of memory 1420) or storage and can be configured to execute instructions stored in the memory 1420 or storage to enable various apparatus, applications, or operating systems to perform operations and/or methods discussed herein. Memory 1420 can be configured to store one or more medical imaging scans. Each of the medical imaging scan(s) can comprise a plurality of pixels or voxels, each pixel or voxel having an associated intensity. Memory 1420 can be further configured to store additional data involved in performing operations discussed herein, such as information employed in various methods (e.g., 100, 200, etc.) discussed in greater detail herein.

Apparatus 1400 can also comprise an input/output (I/O) interface 1430 (e.g., associated with one or more I/O devices), a set of circuits 1450, and an interface 1440 that connects the processor(s) 1410, the memory 1420, the I/O interface 1430, and the set of circuits 1450. I/O interface 1430 can be configured to transfer data between memory 1420, processor 1410, circuits 1450, and external devices, for example, a medical imaging device (e.g., CT system, etc.), and/or one or more remote devices for receiving inputs and/or providing outputs to a clinician, patient, etc., such as optional personalized medicine device 1460.

The processor(s) 1410 and/or one or more circuits of the set of circuits 1450 can perform one or more acts associated with a method or set of operations discussed herein, such as set of operations 100 and/or 200. In various embodiments, different acts (e.g., different operations of a set of operations) can be performed by the same or different processor(s) 1410 and/or one or more circuits of the set of circuits 1450.

Apparatus 1400 can optionally further comprise personalized medicine device 1460. Apparatus 1400 can be configured to provide a prognosis (e.g., predicted response or non-response to a potential treatment) for a patient determined based at least in part on a combination of radiomic features and deep learning as discussed herein, and/or other data to personalized medicine device 1460. Personalized medicine device 1460 may be, for example, a computer assisted diagnosis (CADx) system or other type of personalized medicine device that can be used to facilitate monitoring and/or treatment of an associated medical condition. In some embodiments, processor(s) 1410 and/or one or more circuits of the set of circuits 1450 can be further configured to control personalized medicine device 1460 to display the prognosis for a clinician or the patient or other data on a computer monitor, a smartphone display, a tablet display, or other displays.

Examples herein can include subject matter such as an apparatus, a medical imaging system/apparatus, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for generating system-independent quantitative perfusion measurements, according to embodiments and examples described.

Example 1 is a non-transitory computer-readable medium storing computer-executable instructions that, when executed, cause a processor to perform operations, comprising: accessing a medical imaging scan of a tumor, wherein the tumor is segmented on the medical imaging scan; segmenting a peri-tumoral region around the tumor; extracting a first set of radiomic features from the tumor and a second set of radiomic features from the peri-tumoral region; providing the first set of radiomic features to a first machine learning model and the second set of radiomic features to a second machine learning model; providing the segmented tumor to a first deep learning model and the segmented peri-tumoral region to a second deep learning model; receiving a first predicted prognosis for the tumor from the first machine learning model, a second predicted prognosis for the tumor from the second machine learning model, a third predicted prognosis for the tumor from the first deep learning model, and a fourth predicted prognosis for the tumor from the second deep learning model; providing the first predicted prognosis, the second predicted prognosis, the third predicted prognosis, and the fourth predicted prognosis to a third machine learning model; and receiving a combined predicted prognosis for the tumor from the third machine learning model.

Example 2 comprises the subject matter of any variation of any of example(s) 1, wherein the predicted prognosis is one of a pathologically complete response (pCR) to a potential treatment or a non-pCR to the potential treatment.

Example 3 comprises the subject matter of any variation of any of example(s) 1-2, wherein at least one of the first set of radiomic features or the second set of radiomic features comprises a first-order statistic of one or more of the following, extracted from the one of the medical imaging scan or the medical imaging scan after transformation with one of a filter or a wavelet decomposition: at least one Laws energy measure, at least one Gabor feature, at least one Haralick feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one quantitative and/or semi-quantitative pharmacokinetic parameters, at least one Gray Level Dependence Matrix, at least one shape feature, or at least one feature from at least one pre-trained Convolutional Neural Network (CNN)

Example 4 comprises the subject matter of any variation of any of example(s) 3, wherein the first-order statistic is one of a mean, a median, a standard deviation, a skewness, a kurtosis, a range, a minimum, a maximum, a percentile, or histogram frequencies.

Example 5 comprises the subject matter of any variation of any of example(s) 1-4, wherein at least one of the first machine learning model, the second machine learning model, or the third machine learning model is one of, or an ensemble of two or more of: a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, a LASSO, an elastic net, a Gaussian process classification, or a nearest neighbors classification.

Example 6 comprises the subject matter of any variation of any of example(s) 1-5, wherein the tumor is segmented based on expert annotation.

Example 7 comprises the subject matter of any variation of any of example(s) 1-6, wherein at least one of the first deep learning model or the second deep learning model is one of a deep convolutional neural network (CNN), the deep CNN pretrained on non-imaging data, or a custom CNN with at least three convolutional blocks.

Example 8 comprises the subject matter of any variation of any of example(s) 7, wherein at least one of the first deep learning model or the second deep learning model is the custom CNN, wherein each convolutional block of the custom CNN comprises at least one and at most three convolutional layers.

Example 9 comprises the subject matter of any variation of any of example(s) 7, wherein at least one of the first deep learning model or the second deep learning model employs one of the following optimizers: an Adam optimizer, a stochastic gradient descent (SGD) optimizer, a SGD optimizer with momentum, or a SGD optimizer with Nesterov momentum.

Example 10 comprises the subject matter of any variation of any of example(s) 1-9, wherein the peri-tumoral region comprises an annular ring surrounding the tumor with a width between 2 mm and 4 mm.

Example 11 is an apparatus, comprising: a memory configured to store a medical imaging scan of a tumor, wherein the tumor is segmented on the medical imaging scan; and one or more processors configured to: segment a peri-tumoral region around the tumor; extract a first set of radiomic features from the tumor and a second set of radiomic features from the peri-tumoral region; provide the first set of radiomic features to a first machine learning model and the second set of radiomic features to a second machine learning model; provide the segmented tumor to a first deep learning model and the segmented peri-tumoral region to a second deep learning model; receive a first predicted prognosis from the first machine learning model, a second predicted prognosis from the second machine learning model, a third predicted prognosis from the first deep learning model, and a fourth predicted prognosis from the second deep learning model; provide the first predicted prognosis, the second predicted prognosis, the third predicted prognosis, and the fourth predicted prognosis to a third machine learning model; and receive a combined predicted prognosis for the tumor from the third machine learning model.

Example 12 comprises the subject matter of any variation of any of example(s) 11, wherein the predicted prognosis is one of a pathologically complete response (pCR) to a potential treatment or a non-pCR to the potential treatment.

Example 13 comprises the subject matter of any variation of any of example(s) 11-12, wherein at least one of the first set of radiomic features or the second set of radiomic features comprises a first-order statistic of one or more of the following, extracted from the one of the medical imaging scan or the medical imaging scan after transformation with one of a filter or a wavelet decomposition: at least one Laws energy measure, at least one Gabor feature, at least one Haralick feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one quantitative and/or semi-quantitative pharmacokinetic parameters, at least one Gray Level Dependence Matrix, at least one shape feature, or at least one feature from at least one pre-trained Convolutional Neural Network (CNN)

Example 14 comprises the subject matter of any variation of any of example(s) 13, wherein the first-order statistic is one of a mean, a median, a standard deviation, a skewness, a kurtosis, a range, a minimum, a maximum, a percentile, or histogram frequencies.

Example 15 comprises the subject matter of any variation of any of example(s) 11-14, wherein at least one of the first machine learning model, the second machine learning model, or the third machine learning model is one of, or an ensemble of two or more of: a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, a LASSO, an elastic net, a Gaussian process classification, or a nearest neighbors classification.

Example 16 comprises the subject matter of any variation of any of example(s) 11-15, wherein the tumor is segmented based on expert annotation.

Example 17 comprises the subject matter of any variation of any of example(s) 11-16, wherein at least one of the first deep learning model or the second deep learning model is one of a deep convolutional neural network (CNN) pretrained on non-imaging data or a custom CNN with at least three and at most five convolutional blocks.

Example 18 comprises the subject matter of any variation of any of example(s) 17, wherein at least one of the first deep learning model or the second deep learning model is one of a deep convolutional neural network (CNN), the deep CNN pretrained on non-imaging data, or a custom CNN with at least three convolutional blocks.

Example 19 comprises the subject matter of any variation of any of example(s) 17, wherein at least one of the first deep learning model or the second deep learning model employs one of the following optimizers: an Adam optimizer, a stochastic gradient descent (SGD) optimizer, a SGD optimizer with momentum, or a SGD optimizer with Nesterov momentum.

Example 20 comprises the subject matter of any variation of any of example(s) 11-19, wherein the peri-tumoral region comprises an annular ring surrounding the tumor with a width between 2 mm and 4 mm.

Example 21 is a non-transitory computer-readable medium storing computer-executable instructions that, when executed, cause a processor to perform operations, comprising: accessing a training set comprising a plurality of medical imaging scans, wherein each medical imaging scan of the training set comprises an associated tumor segmented on that medical imaging scan, wherein the associated tumor has an associated known prognosis; for each medical imaging scan of the training set: extracting a first set of radiomic features from the associated tumor of that medical imaging scan and a second set of radiomic features from an associated peri-tumoral region around the associated tumor; training a first machine learning model based on the associated known prognosis and the first set of radiomic features of that medical imaging scan, and a second machine learning model based on the associated known prognosis and the second set of radiomic features of that medical imaging scan; training a first deep learning model based on the associated known prognosis and the associated tumor segmented on that medical imaging scan, and a second deep learning model based on the associated known prognosis and the associated peri-tumoral region of that medical imaging scan; and training a third machine learning model based on the associated known prognosis for that medical imaging scan and on associated outputs from the first machine learning model, the second machine learning model, the first deep learning model, and the second deep learning model.

Example 22 comprises the subject matter of any variation of any of example(s) 21, wherein at least one of the first set of radiomic features or the second set of radiomic features are determined based at least in part on one or more of a Wilcoxon rank-sum test, a minimum redundancy maximum relevance algorithm, a t-test, a variance thresholding, a mutual information, an F-test, a chi-squared test, a Bhattacharyya distance, an entropy, a principal component analysis (PCA), a PCA variable importance on projection (PCA-VIP), a kernel PCA, a Uniform Manifold Approximation and Projection (UMAP), an autoencoder, a variational autoencoder, a locally linear embedding (LLE), or a t-distributed stochastic neighbor embedding.

Example 23 comprises the subject matter of any variation of any of example(s) 21-22, wherein the predicted prognosis is one of a pathologically complete response (pCR) to a potential treatment or a non-pCR to the potential treatment.

Example 24 comprises the subject matter of any variation of any of example(s) 21-23, wherein at least one of the first set of radiomic features or the second set of radiomic features comprises a first-order statistic of one or more of the following, extracted from the one of the medical imaging scan or the medical imaging scan after transformation with one of a filter or a wavelet decomposition: at least one Laws energy measure, at least one Gabor feature, at least one Haralick feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one quantitative and/or semi-quantitative pharmacokinetic parameters, at least one Gray Level Dependence Matrix, at least one shape feature, or at least one feature from at least one pre-trained Convolutional Neural Network (CNN)

Example 25 comprises the subject matter of any variation of any of example(s) 24, wherein the first-order statistic is one of a mean, a median, a standard deviation, a skewness, a kurtosis, a range, a minimum, a maximum, a percentile, or histogram frequencies.

Example 26 comprises the subject matter of any variation of any of example(s) 21-25, wherein at least one of the first machine learning model, the second machine learning model, or the third machine learning model is one of, or an ensemble of two or more of: a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, a LASSO, an elastic net, a Gaussian process classification, or a nearest neighbors classification.

Example 27 comprises the subject matter of any variation of any of example(s) 21-26, wherein the tumor is segmented based on expert annotation.

Example 28 comprises the subject matter of any variation of any of example(s) 21-27, wherein at least one of the first deep learning model or the second deep learning model is one of a deep convolutional neural network (CNN), the deep CNN pretrained on non-imaging data, or a custom CNN with at least three convolutional blocks.

Example 29 comprises the subject matter of any variation of any of example(s) 28, wherein at least one of the first deep learning model or the second deep learning model is the custom CNN, wherein each convolutional block of the custom CNN comprises at least one and at most three convolutional layers.

Example 30 comprises the subject matter of any variation of any of example(s) 28, wherein at least one of the first deep learning model or the second deep learning model employs one of the following optimizers: an Adam optimizer, a stochastic gradient descent (SGD) optimizer, a SGD optimizer with momentum, or a SGD optimizer with Nesterov momentum.

Example 31 comprises the subject matter of any variation of any of example(s) 21-30, wherein the peri-tumoral region comprises an annular ring surrounding the tumor with a width between 2 mm and 4 mm.

Example 32 comprises an apparatus comprising means for executing any of the described operations of examples 1-31.

Example 33 comprises a machine readable medium that stores instructions for execution by a processor to perform any of the described operations of examples 1-31.

Example 34 comprises an apparatus comprising: a memory; and one or more processors configured to: perform any of the described operations of examples 1-31.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:
    extracting a first set of radiomic features from a tumor segmented in a medical imaging scan and a second set of radiomic features from a segmented peri-tumoral region around the segmented tumor;
    providing the first set of radiomic features to a first machine learning model and the second set of radiomic features to a second machine learning model;
    providing the segmented tumor to a first deep learning model and the segmented peri-tumoral region to a second deep learning model;
    receiving a first predicted prognosis for the tumor from the first machine learning model, a second predicted prognosis for the tumor from the second machine learning model, a third predicted prognosis for the tumor from the first deep learning model, and a fourth predicted prognosis for the tumor from the second deep learning model;
    providing the first predicted prognosis, the second predicted prognosis, the third predicted prognosis, and the fourth predicted prognosis to a combination learning model; and
    receiving a combined predicted prognosis for the tumor from the combination learning model.

2. The non-transitory computer-readable medium of claim 1, wherein the combined predicted prognosis is one of a pathologically complete response (pCR) to a potential treatment or a non-pCR to the potential treatment.

3. The non-transitory computer-readable medium of claim 1, wherein at least one of the first set of radiomic features or the second set of radiomic features comprises a first-order statistic of one or more of the following, extracted from the medical imaging scan after transformation with one of a filter or a wavelet decomposition: at least one Laws energy measure, at least one Gabor feature, at least one Haralick feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one quantitative and/or semi-quantitative pharmacokinetic parameters, at least one Gray Level Dependence Matrix, at least one shape feature, or at least one feature from at least one pre-trained Convolutional Neural Network (CNN).

4. The non-transitory computer-readable medium of claim 3, wherein the first-order statistic is one of a mean, a median, a standard deviation, a skewness, a kurtosis, a range, a minimum, a maximum, a percentile, or histogram frequencies.

5. The non-transitory computer-readable medium of claim 1, wherein at least one of the first machine learning model, the second machine learning model, or the combination learning model is one of, or an ensemble of two or more of: a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, a LASSO, an elastic net, a Gaussian process classification, or a nearest neighbors classification.

6. The non-transitory computer-readable medium of claim 1, wherein the tumor is segmented based on expert annotation.

7. The non-transitory computer-readable medium of claim 1, wherein at least one of the first deep learning model or the second deep learning model is one of a deep convolutional neural network (CNN), the deep CNN pretrained on non-imaging data, or a custom CNN with at least three convolutional blocks.

8. The non-transitory computer-readable medium of claim 7, wherein at least one of the first deep learning model or the second deep learning model is the custom CNN, wherein each convolutional block of the custom CNN comprises at least one and at most three convolutional layers.

9. The non-transitory computer-readable medium of claim 7, wherein at least one of the first deep learning model or the second deep learning model employs one of the following optimizers: an Adam optimizer, a stochastic gradient descent (SGD) optimizer, a SGD optimizer with momentum, or a SGD optimizer with Nesterov momentum.

10. The non-transitory computer-readable medium of claim 1, wherein the segmented peri-tumoral region comprises an annular ring surrounding the segmented tumor with a width between 2 mm and 4 mm.

11. An apparatus, comprising:
a memory configured to store data derived from a medical imaging scan including a tumor in which the tumor is segmented; and
one or more processors configured to:
extract a first set of radiomic features from the segmented tumor and a second set of radiomic features from a segmented peri-tumoral region around the segmented tumor;
provide the first set of radiomic features to a first machine learning model and the second set of radiomic features to a second machine learning model;
provide the segmented tumor to a first deep learning model and the segmented peri-tumoral region to a second deep learning model;
receive a first predicted prognosis from the first machine learning model, a second predicted prognosis from the second machine learning model, a third predicted prognosis from the first deep learning model, and a fourth predicted prognosis from the second deep learning model;
provide the first predicted prognosis, the second predicted prognosis, the third predicted prognosis, and the fourth predicted prognosis to a combination learning model; and
receive a combined predicted prognosis for the tumor from the combination learning model.

12. The apparatus of claim 11, wherein the combined predicted prognosis is one of a pathologically complete response (pCR) to a potential treatment or a non-pCR to the potential treatment.

13. The apparatus of claim 11, wherein at least one of the first set of radiomic features or the second set of radiomic features comprises a first-order statistic of one or more of the following, extracted from the one of the medical imaging scan or the medical imaging scan after transformation with one of a filter or a wavelet decomposition: at least one Laws energy measure, at least one Gabor feature, at least one Haralick feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one quantitative and/or semi-quantitative pharmacokinetic parameters, at least one Gray Level Dependence Matrix, at least one shape feature, or at least one feature from at least one pre-trained Convolutional Neural Network (CNN).

14. The apparatus of claim 13, wherein the first-order statistic is one of a mean, a median, a standard deviation, a skewness, a kurtosis, a range, a minimum, a maximum, a percentile, or histogram frequencies.

15. The apparatus of claim 11, wherein at least one of the first machine learning model, the second machine learning model, or the combination learning model is one of, or an ensemble of two or more of: a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, a LASSO, an elastic net, a Gaussian process classification, or a nearest neighbors classification.

16. The apparatus of claim 11, wherein the tumor is segmented based on expert annotation.

17. The apparatus of claim 11, wherein at least one of the first deep learning model or the second deep learning model is one of a deep convolutional neural network (CNN), the deep CNN pretrained on non-imaging data, or a custom CNN with at least three convolutional blocks.

18. The apparatus of claim 17, wherein at least one of the first deep learning model or the second deep learning model is the custom CNN, wherein each convolutional block of the custom CNN comprises at least one and at most three convolutional layers.

19. The apparatus of claim 17, wherein at least one of the first deep learning model or the second deep learning model employs one of the following optimizers: an Adam optimizer, a stochastic gradient descent (SGD) optimizer, a SGD optimizer with momentum, or a SGD optimizer with Nesterov momentum.

20. The apparatus of claim 11, wherein the segmented peri-tumoral region comprises an annular ring surrounding the segmented tumor with a width between 2 mm and 4 mm.

21. A non-transitory computer-readable medium storing computer-executable instructions that, when executed, cause a processor to perform operations, comprising:
accessing a training set comprising a plurality of medical imaging scans, wherein each medical imaging scan of the training set comprises an associated tumor segmented on that medical imaging scan, wherein the associated tumor has an associated known prognosis;
for each medical imaging scan of the training set:
extracting a first set of radiomic features from the associated segmented tumor of that medical imaging scan and a second set of radiomic features from an associated peri-tumoral region around the associated segmented tumor;
training a first machine learning model based on the associated known prognosis and the first set of radiomic features of that medical imaging scan, and a second machine learning model based on the associated known prognosis and the second set of radiomic features of that medical imaging scan;
training a first deep learning model based on the associated known prognosis and the associated segmented segmented tumor, and a second deep learning model based on the associated known prognosis and the associated peri-tumoral region of that medical imaging scan; and
training a combination learning model based on the associated known prognosis for that medical imaging scan and on associated outputs from the first machine learning model, the second machine learning model, the first deep learning model, and the second deep learning model.

22. The non-transitory computer-readable medium of claim 21, wherein at least one of the first set of radiomic features or the second set of radiomic features are determined based at least in part on one or more of a Wilcoxon rank-sum test, a minimum redundancy maximum relevance algorithm, a t-test, a variance thresholding, a mutual information, an F-test, a chi-squared test, a Bhattacharyya distance, an entropy, a principal component analysis (PCA), a PCA variable importance on projection (PCA-VIP), a kernel PCA, a Uniform Manifold Approximation and Projection (UMAP), an autoencoder, a variational autoencoder, a locally linear embedding (LLE), or a t-distributed stochastic neighbor embedding.

23. The non-transitory computer-readable medium of claim 21, wherein the associated known prognosis is one of a pathologically complete response (pCR) to a potential treatment or a non-pCR to the potential treatment.

24. The non-transitory computer-readable medium of claim 21, wherein at least one of the first set of radiomic features or the second set of radiomic features comprises a first-order statistic of one or more of the following, extracted from the one of the plurality of medical imaging scans or the plurality of medical imaging scans after transformation with one of a filter or a wavelet decomposition: at least one Laws energy measure, at least one Gabor feature, at least one Haralick feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one quantitative and/or semi-quantitative pharmacokinetic parameters, at least one Gray Level Dependence Matrix, at least one shape feature, or at least one feature from at least one pre-trained Convolutional Neural Network (CNN).

25. The non-transitory computer-readable medium of claim 24, wherein the first-order statistic is one of a mean, a median, a standard deviation, a skewness, a kurtosis, a range, a minimum, a maximum, a percentile, or histogram frequencies.

26. The non-transitory computer-readable medium of claim 21, wherein at least one of the first machine learning model, the second machine learning model, or the combination learning model is one of, or an ensemble of two or more of: a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, a LASSO, an elastic net, a Gaussian process classification, or a nearest neighbors classification.

27. The non-transitory computer-readable medium of claim 21, wherein the associated tumor is segmented based on expert annotation.

28. The non-transitory computer-readable medium of claim 21, wherein at least one of the first deep learning model or the second deep learning model is one of a deep convolutional neural network (CNN), the deep CNN pre-trained on non-imaging data, or a custom CNN with at least three convolutional blocks.

29. The non-transitory computer-readable medium of claim 28, wherein at least one of the first deep learning model or the second deep learning model is the custom CNN, wherein each convolutional block of the custom CNN comprises at least one and at most three convolutional layers.

30. The non-transitory computer-readable medium of claim 28, wherein at least one of the first deep learning model or the second deep learning model employs one of the following optimizers: an Adam optimizer, a stochastic gradient descent (SGD) optimizer, a SGD optimizer with momentum, or a SGD optimizer with Nesterov momentum.

31. The non-transitory computer-readable medium of claim 21, wherein the associated peri-tumoral region comprises an annular ring surrounding the associated segmented tumor with a width between 2 mm and 4 mm.

32. A method, comprising:
extracting a first set of radiomic features from a tumor segmented in a medical imaging scan and a second set of radiomic features from a segmented peri-tumoral region around the segmented tumor;
providing the first set of radiomic features to a first machine learning model and the second set of radiomic features to a second machine learning model;
providing the segmented tumor to a first deep learning model and the segmented peri-tumoral region to a second deep learning model;
receiving a first predicted prognosis for the tumor from the first machine learning model, a second predicted prognosis for the tumor from the second machine learning model, a third predicted prognosis for the tumor from the first deep learning model, and a fourth predicted prognosis for the tumor from the second deep learning model;

providing the first predicted prognosis, the second predicted prognosis, the third predicted prognosis, and the fourth predicted prognosis to a combination learning model; and receiving a combined predicted prognosis for the tumor from the combination learning model.

* * * * *

UNITED STATES PATENT AND TRADEMARK OFFICE
CERTIFICATE OF CORRECTION

| | |
|---|---|
| PATENT NO. | : 11,810,292 B2 |
| APPLICATION NO. | : 17/038934 |
| DATED | : November 7, 2023 |
| INVENTOR(S) | : Anant Madabhushi et al. |

It is certified that error appears in the above-identified patent and that said Letters Patent is hereby corrected as shown below:

In the Specification

Column 1, Lines 20 through 27; please replace "This invention was made with government support under the grant(s) CA199374, CA202752, CA208236, CA216579, CA220581, CA221383, CA239055, RR012463 awarded by the National Institutes of Health; grant IBX004121A awarded by the United States Department of Veterans Affairs; and grant(s) W8IXWH-15-1-0558, W8IXWH-18-1-0440, and W8IXWH-16-1-0329, awarded by the United States Department of Defense." With --This invention was made with government support under CA199374, CA202752, CA208236, CA216579, CA220581, CA221383, CA239055, and RR012463 awarded by the National Institutes of Health; under IBX004121A awarded by the Department of Veterans Affairs; and under W8IXWH-15-1-0558, W8IXWH-18-1-0440, and W8IXWH-16-1-0329, awarded by the Department of Defense. The government has certain rights in the invention.--

Signed and Sealed this
Sixteenth Day of January, 2024

Katherine Kelly Vidal
*Director of the United States Patent and Trademark Office*